Dec. 12, 1961  G. MARZOLF  3,012,757
BOAT HOIST
Filed July 21, 1957  2 Sheets-Sheet 1

INVENTOR
GEORGE MARZOLF

BY *Vernon S. Fristad*

ATTORNEY

Dec. 12, 1961   G. MARZOLF   3,012,757
BOAT HOIST
Filed July 21, 1957   2 Sheets-Sheet 2
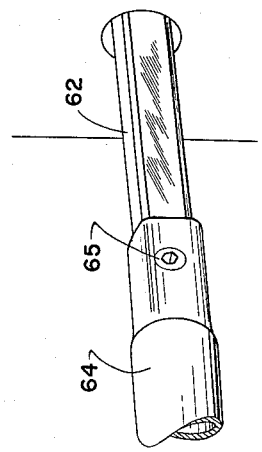
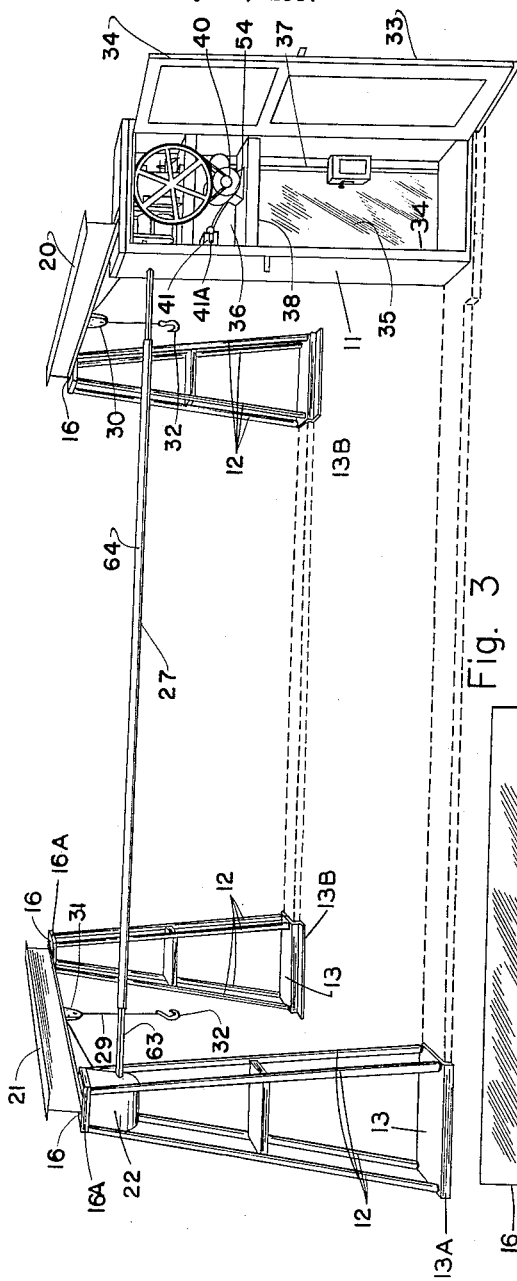
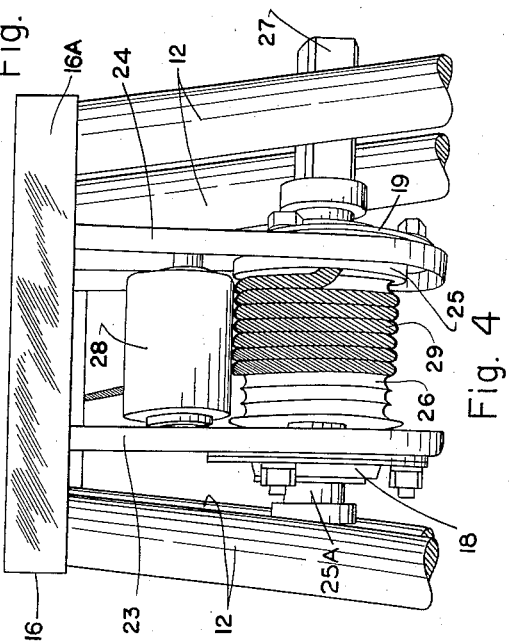
INVENTOR
GEORGE MARZOLF
BY *Vernon J. Froistad*
ATTORNEY

United States Patent Office 3,012,757
Patented Dec. 12, 1961

3,012,757
BOAT HOIST
George Marzolf, St. Paul, Minn., assignor to Farwell, Ozmun, Kirk & Co., St. Paul, Minn., a corporation of Minnesota
Filed June 21, 1957, Ser. No. 667,098
8 Claims. (Cl. 254—144)

My invention relates to a boat hoist or boat lift, which is of durable construction, is easily assembled and simple to operate.

It is an object of my invention to provide a boat lift or boat hoist designed for raising inboard or outboard power boats, commonly used on inland lakes or other navigable waters, out of the water at docking facilities. This out-of-the-water storage serves to minimize hull repairs and provides a quick and easy method for storage of power boats. Employment of my hoist will also permit the ready inspection of the boat and facilitates repairs, because of the accessibility of the various portions of the hull.

It is a further object of my invention to provide a boat hoist for storing a power boat in a raised position at dockside or near the shore. This serves to keep the hull of the boat drier, thereby preventing a water-logged condition. It is well known that a water-logged hull will increase the weight of a boat, reduce its efficiency and decrease its speed. Additionally, a water-logged hull may, because of non-uniform absorption, create an unbalanced condition in the boat. By maintaining a condition of dry storage the desired performance, or operation, may be achieved.

It is a further object to provide dry storage to eliminate marine growth on the normally submerged portions of the hull below the water line. An accumulation of marine growth will tend to reduce boat efficiency and will also reduce its speed.

Still a further object achieved through use of my boat hoist is that the above-the-water storage will tend to minimize damage which may result from wind storms, or other adverse weather conditions with accompanying high winds. As docking facilities are normally adjacent the shore, the wave action of a lake or river is considerably increased, and provision of storage above the water will prevent damage from wind whipped waves which crash upon the shore. It is also well known that many storms arise unexpectedly and storage of a boat on my hoist can eliminate the need for providing additional mooring lines or other equipment, should such a storm arise unexpectedly. The boat owner can store his craft in the boat hoist of my design and know that his boat will be safe, except in the most severe storms.

My device is fully dependable and provides convenient and readily accessible storage facilities. The hoist is designed so as to be easily installed at docking facilities in a minimum of time. The hoist is so arranged that the lifting components can easily be attached to the boat while the boat owner or operator is within the craft. The various moving elements of the hoist are designed to be protected from water and weather deterioration.

The features of my boat hoist which are of primary importance are that it is easily installed near the shore or on a dock and is easily disassembled for removal therefrom. Although the boat hoist could be attached to vertically adjustable bases, suitably anchored on the lake bottom, in the construction described herein the supporting elements are designed to rest upon the dock surface and consequently require no adjustment for variations in water level in the lake. With my design of base construction the base planks upon which the hoist rests provide a maximum weight distribution over the dock surface area so that no undue stresses are created at isolated points. The hoist is made of several components, which are easily assembled, and this feature facilitates installation on a dock and also removal therefrom. A unitary construction is employed which utilizes a minimum of operating parts, and accordingly simplifies repairs. The operating mechanism, which performs the lifting function is housed in a substantially weather-tight cabinet and is thereby protected from deterioration.

The drums upon which the lifting cable is wound are provided with anti-fouling rollers. These rollers prevent the lift cables from being damaged, provide evenly spaced windings, and prevent back-lash when tension is removed from the cables. Additionally, the hoist is designed so as to provide for longitudinal adjustment thereby enabling the hoist to be used with power boats of various lengths.

Provisions are made for employing a powered unit; however, the device can be adapted for a hand driven mechanism for use as an emergency power source in the event of power failure. The hoist is also adapted to receive supporting brackets for a canopy or similar covering for protecting the boat.

The unit is designed to employ a single power mechanism which is connected through a reducing gear to the drums upon which the lifting cable is wound. The after, or rear drum is driven by a connecting shaft and therefore rotates at the same speed as the forward, or front, lifting drum. Both the front and rear lifts operate from a single control, thereby providing a uniform and level hoisting operation. These features overcome a deficiency in existing hoists, wherein two separate power mechanisms, and a multiplicity of controls, are employed. In these existing devices, it is difficult to achieve a uniform lift simultaneously at the bow and stern of the boat.

In the drawings forming a part of this specification:

FIGURE 3 is a side perspective elevation showing the hoist separate from the dock with the control cabinet in open position;

FIGURE 4 is an enlarged detail drawing of the after, or rear, drum and anti-fouling roller, shown with the protective cover removed; and FIGURE 5 is an enlarged detail drawing of the drive shaft to indicate the method of longitudinal adjustment.

Figure 1:
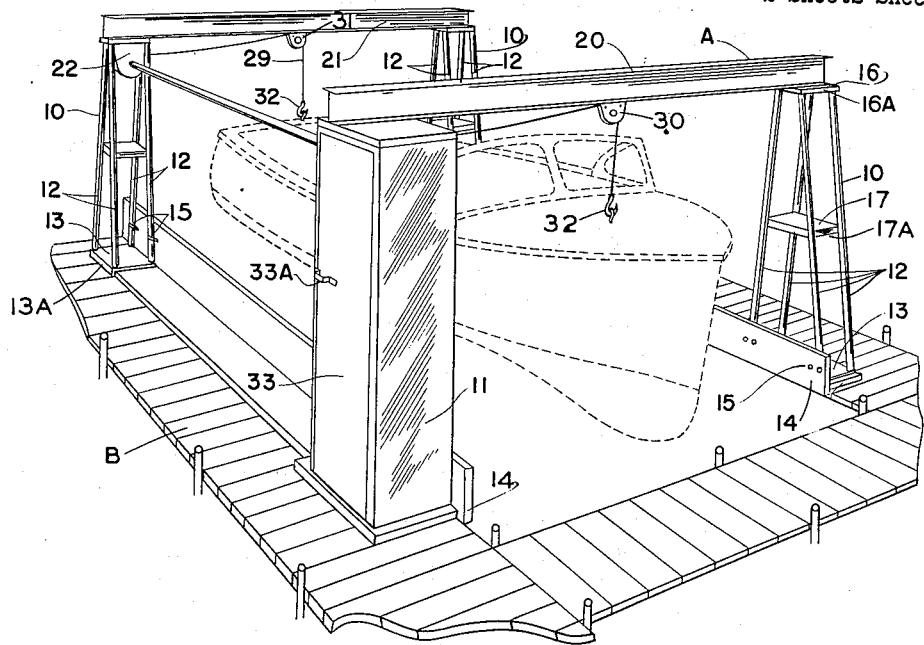
FIGURE 1 is a front perspective elevation of my hoist installed upon a dock, and showing a boat in storage position.

Referring now to the drawings and specifically to FIGURE 1, which shows the lift or hoist, generally indicated by the reference A, installed upon a dock B. The supporting structure consists of the three similar pylons 10 and the control cabinet 11. The supporting pylons, as illustrated, contain four tubular steel legs 12 which are vertically disposed and inclined angularly inward in their longitudinal planes. Although these members are illustrated and described as being tubular steel, other suitable material such as I-beams are equally well adapted. The individual tubular members 12 are positioned to provide a wide base and are convergent in their longitudinal plans to provide an upper surface of reduced dimensions.

The lower portions of the individual tubular members 12 are positioned upon a steel base plate 13 and are suitably attached thereto. The steel base plate 13 is formed as a channel member, having depending longitudinal flanges 13a. Disposed within the channeled base, and extending longitudinally, are mounting planks or boards which serve to distribute the weight of the hoist and the boat over a maximum surface area of the dock. At the lowermost extremity of the inner depending flange is formed an inwardly extending flange 13b, which extends at an angle of ninety degrees toward the center of the hoist and lies in a plane parallel with the top of the base plate. The purpose of this latter flange 13b is to provide a support for the bumper planks 14 which form a smooth fender surface within the hoist. The bumper planks 14 are affixed to the hoist by means of the U-shaped hooks 15 which are drawn about the inner tubular legs 12 of the pylons 10.

Approximately midway between the base plate 13 and the top plate 16 is the intermediate plate 17 which is fixedly attached within the pylon legs 12 for reinforcement purposes. The inclusion of the reinforcement plate 17 reduces the twisting moments on the pylons 10 and provides maximum stabilization therefor. The intermediate reinforcement plates 17 are formed of flat steel and have depending flanges 17a on all four sides thereof. The depending flanges 17a provide for a more secure attachment to the tubular legs 12 and are welded, bolted, or otherwise attached to the tubular legs of the pylon.

The top, or cap plate 16 serves to maintain the four supporting legs in a fixed relationship at their upper ends, and also serves as a base member for the cross or lifting beams 20 and 21. The cap plate 16 is preferably formed of flat steel and has depending flanges 16a formed on all sides thereof. The tubular supporting legs 12 are positioned within the outer dimensions of the cap plate 16 and are fixedly attached thereto by means of a weldment, bolts, or other suitable means. The cap plate 16 contains, in its flat upper surface, suitable apertures for removably attaching the cross beams 20 and 21.

The after starboard, or right rear, pylon is very nearly identical to the other two pylons 10 but supports beneath its cap plate 16 a suitable drum 25 upon which the lifting cable 29 is wound. The lifting drum 25, which will be described hereinafter, is mounted within the enclosure 22 on the right rear pylon.

Referring now to FIGURE 4, attached through the underside of the cap plate 16 to the flanges of the cross beam 21, are the depending support brackets 23 and 24. Straddle mounted between the support brackets, in suitable anti-friction bearings 18 and 19, is the cable drum 25 which has a plurality of helical grooves 26 formed thereon. The shaft 25a of the drum 25 is suitably journaled in ball, or roller bearings 18 and 19 mounted in the depending brackets 23 and 24. These bearings permit only a minimum of friction and provide for the easy rotation of the cable drum 25. The drum 25 is driven by the shaft 27 which extends longitudinally forward to the driving gear within the control cabinet.

Mounted directly above the cable drum 25 is the idler roller 28 which is also suitably journaled in bearings mounted in the sides of the depending brackets 23 and 24. The idler roller 28 is mounted in close proximity to the cable drum 25 so that as the cable 29 is wound upon the drum 25 the outer tangential surface of the cable will be in contact with the idler roller 28. The idler roller 28 is properly termed an anti-fouling roller for it causes the cable to be positioned within the proper grooves on the cable drum and prevents an improper winding of cable 29. It also will tend to force the cable 29 into the proper grooves 26 thereby avoiding any damage to the lifting cable. In addition, the anti-fouling roller 28 will prevent back-lash of the lift cable 29 when tension is removed therefrom. Being mounted in close proximity above the cable drum 25, the anti-fouling roller prevents the unwinding or springing apart of the cable 29 when the boat is removed from the lifting cable. The anti-fouling rollers are preferably formed of steel, rubber, or other abrasion resistant synthetic material so as to provide a greater life due to the fact that the roller is in contact with the steel cables 29. It should also be noted that the anti-fouling roller 28, in cooperation with the grooved lifting drum 25, will prevent any kinking of the lifting cable 29 and thereby increase the cable life. The grooves 26 in the cable drum are semi-circular in cross section and have a rounded peak to avoid fraying the lifting cable 29.

The depending support brackets 23 and 24 have inwardly extending reinforcing flanges which serve as a base for a protective cover 22 to protect the anti-fouling roller 28 and the cable drum 25 from the elements. The protective cover 22 is normally formed of a sheet metal material and is easily attached to the inner surface of the top plate 16 by means of screws or the like.

The cross beams 20 and 21 as illustrated in FIGURES 1 and 3, are of sufficient strength to support, at mid-span, the weight of the boat. The cross beams are illustrated as I-beams; however, other suitable supporting members can be employed. The ends of the after, or rear, cross beam 21 rest upon the cap plates 16 of the pylons 10. The ends of the forward, or front, cross beam 20 rest upon the cap plate 16 of the front pylon 10 and upon the top surface of the control cabinet 11. The cross beams 20 and 21 are removably attached to the support structures by means of bolts, to facilitate the assembly and disassembly of the hoist structure. Attached to the cross beams 20 and 21, at mid-span, are the pulleys 30 and 31. These pulleys are constructed with suitable anti-friction means, such as ball bearings, to minimize rotational friction. The pulleys 30 and 31 have front and rear sheaths, or plates, serving primarily as a safety measure and secondarily as a guide for the lifting cable 29. The lift cable 29 extends outward from the cable drums, over the pulley and downwardly toward the boat, when it is positioned within the dock. Attached to the free end of the lift cable 29 are the lifting hooks 32, which are adapted for engagement with the bow and stern lifting rings of the boat.

Referring now to FIGURE 1, and more specifically to FIGURE 3, which discloses the control cabinet 11 in an open position. The control cabinet 11 is formed of a sheet metal material of a suitable strength to support the combined weight of the cross beam 20 and the boat. The cabinet 11 is generally rectangular in area and is of a height equal to that of the pylons 10. As previously stated, the control cabinet supports one end of the cross beam 20, which is suitably attached thereto by means of bolts. The control cabinet is constructed so as to be substantially weather-tight to protect the operating mechanism from the elements, thereby insuring more dependable operation and an increased equipment life. A full height door 33 is attached to the cabinet by means of internally mounted hinges and suitable latch and lock means 33a are affixed to the door at its opposite side. The frame for the door 33 is formed with inwardly extending flanges 34 along its side and top edges, and the door 33 is flush mounted therein. Formed on the edges of the door 33 are inwardly extending flanges which serve to reinforce the door and also position it in a flush position with the face of the cabinet.

The control cabinet 11 is divided generally into two sections, the lower section 35 and the upper section 36. The lower cabinet 35, or section, can be utilized for storage of marine equipment, and this compartment also serves as a means for service entrance of the conduit 37 containing the power supply conductors for the motor. The upper compartment is subdivided into two sections, 36a and 36b. The power mechanism of the hoist is separately contained in the two compartments 36a and 36b and is compactly arranged in a minimum of space. The lower equipment compartment 36a contains a shelf 38 whose area is nearly coextensive with that of the inside of the cabinet. Supported on the shelf 38 is a reversable motor 39 of suitable size, and as described here is a fractional horsepower, electric motor. Keyed to the motor shaft 39a is the pulley 40 of a nominal diameter. Also mounted on the shelf 38 is a lever-operated drum switch 41 having three positions. The switch box 42 is inscribed with suitable indicia 42a to indicate a "Raise" operation when the switch lever 41a is disposed in an upward position. The switch box 42 also contains indicia 42b to indicate a "Lower" operation when the switch is disposed in a downward position. The intermediate lever position, between "Raise" and "Lower" is the normal "Off" position of the switch, and suitable springs urge the lever into the "Off" position unless force is exerted to move the lever into either the "Up" or "Down" position of operation.

It should be noted that a positive force must be exerted in order to cause the hoist to operate, in that the operator must physically move and hold the lever of the switch for either "Raise" or "Lower" operation, and as soon as the operator releases his grip the lever is spring urged into its "Off" position immediately. This feature is important as override is prevented and no cable damage will result.

Figure 2:
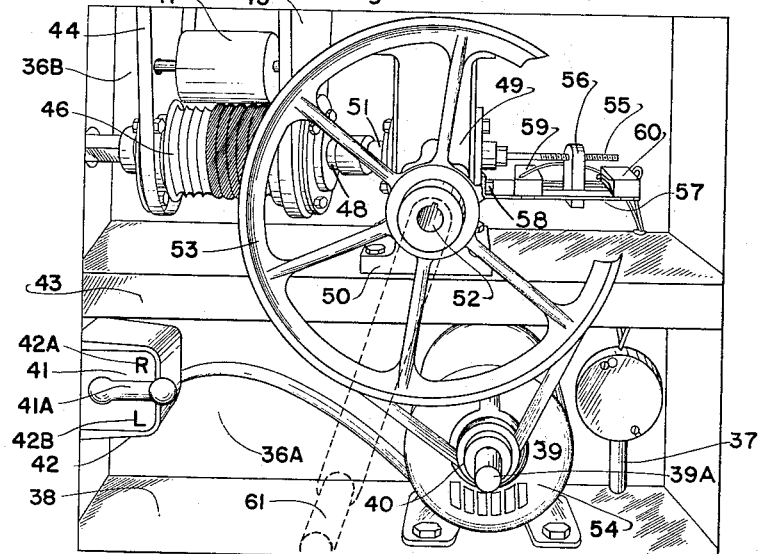
FIGURE 2 is a detailed view of the operating mechanism, with a hand crank shown in dotted outline.

Positioned between the shelf 38 and the top of the cabinet 11 is a second shelf 43 of the same dimensions as that of the first shelf 38, and suspended from the cross beam 20 through the top wall of the cabinet 11 are the depending support brackets 44 and 45, as best illustrated in FIGURE 2. The supporting brackets 44 and 45 are identical to the supporting brackets 23 and 24 which are located on the after pylon. Straddle mounted in anti-friction bearings in the support brackets 44 and 45 is the cable reel 46 and the anti-fouling roller 47. The cable drum 46 is identical in construction to the cable drum 25, and the anti-fouling roller is identical to the anti-fouling roller 28, both of which are described hereinbefore. The forward end of the shaft 48 of the cable drum 46 is coupled directly to the drum shaft of the reduction gear 49. Suitable mounting means are provided in the supporting brackets 44 and 45 for mounting the shaft of the anti-fouling roller 47. The base 50 of the reduction gear 49 rests upon the shelf 43 and is suitably attached thereto. The reduction gear employed is of a standard type, well known to those skilled in the art, and consists of a transverse helical or worm gear having an extended shaft 52 thereon. Keyed to the shaft 52 is the pulley wheel 53 of an enlarged diameter, which is illustrated with portions of the wheel broken therefrom, in FIGURE 2. The reduction gear 49 is belt connected between its pulley 53 and the pulley 40 located on the shaft 39a of the motor 39. The motor pulley 40 being of a small diameter and the pulley 53 of the reduction gear 49 being of an enlarged diameter serves, when belt connected, as an initial step of gear reduction. Suitable chain, or other, means can be employed in lieu of a belt for this connection. The pitch of the teeth on the worm gear is such that the reduction gear provides automatic braking for the hoist, regardless of the position of lift.

Attached to the forwardmost end of the longitudinal shaft 51 of the reduction gear 49 is a threaded shaft 55. Threadedly attached to the shaft 55 is the limit switch actuator 56. The actuator 56 is of elongated construction and extends downwardly through a longitudinal slot in the bracket plate 57. The bracket plate 57 is attached, by means of bolts 58 to the housing of the reduction gear 49. The bracket plate 57 has longitudinal guide means formed thereon to facilitate the positioning of limit switches 59 and 60. Micro switches are employed to interrupt the power at the selected limits of hoist travel in either an upwardly or downwardly direction. The micro switches 59 and 60 are movably attached to the bracket plate 57 by means of wing nuts, not shown, thereby permitting an easy adjustment of the micro switches to provide the establishment of maximum hoist travel in either a raise or lower direction. The switch actuator 56 extends downwardly through an elongated central opening in the bracket plate 57. This construction permits only longitudinal movement of the switch actuator 56 in a forward or rearward longitudinal plane. As the reduction gear 49 turns, the threaded shaft 55 also turns and the switch actuator 56 is thereby caused to move in either a forward or rearward direction. When the switch actuator 56 has moved in a sufficient direction either forward or rearward, it actuates a contact of the micro switch 59 or 60 and interrupts the power to the motor. As the power supply to the motor is fed through the micro switches, the actuation of the micro switch disconnects the circuit and causes the motor to stop. This protective feature prevents damage to the boat, hoist, and operating mechanism by stopping the travel of the hoist at a predetermined position.

In the event of power failure, a handle, illustrated in dotted outline and referred to by numeral 61, can be attached to the shaft 52 of the reduction gear 49 and the hoist operated manually. Because of the employment of a reduction gear, one person can easily operate the hoist manually to raise or lower a boat.

Longitudinal adjustment between the forward supports and the after pylons is achieved by employing an adjustable longitudinal shaft 27 as illustrated in FIGURE 3. The method of attachment is more clearly illustrated in the enlarged drawing shown by FIGURE 5. The end portions 62 and 63 of the shaft 27 are formed as a square and are preferably reinforced for added strength. The central portion 64 of the shaft 27 is hollow and illustrated in the drawings as being tubular. Consequently the central portion 64 of the shaft 27 may be moved longitudinally at both the forward end 62, of the shaft 27, and at the rear end 63 of the shaft 27. This provides a convenient adjustment for boats of various lengths. The adjustment is accomplished by loosening a set screw such as illustrated by 65, in FIGURE 5, adjusting the central portion of the shaft for greater or lesser length and tightening the set screw. The shaft 27 also serves as a convenient hand rail for passengers embarking or debarking from the boat.

Having thus described my invention, it should be understood that the construction referenced should not be construed to be a limitation and other materials, obvious to those skilled in the art, can be equally well employed within the scope of the following claims.

I claim:

1. In a power hoist for boats, a plurality of multiple member upstanding pylons positioned rectangularly upon a dock to define a boat slip therebetween, reinforcement means for said pylons, a pair of transverse bearing beams mounted upon said pylons, cable means for lifting a boat from the water, pulley means suspended from said transverse beams adapted to direct said cable means, a pair of grooved drum means attached to longitudinally aligned pylons for receiving said cable means, anti-fouling idler rollers cooperable with said grooved drum means to guide said cable means thereon, motor means for driving said grooved drum means, a control cabinet adapted to contain the power mechanism, gear reducer means operably connected to said cable drums for controlling the rate of lift, and limit switch means actuated by said gear reducer means adapted to interrupt the power to said motor means thereby to limit hoist travel within selected limits, said motor means and said gear means being housed in said cabinet.

2. A hoist for power boats including supporting pylons, fender means removably attached to the base of said pylons, an enclosure cabinet forming one of said pylons, an access door swingably attached to said enclosure cabinet, transversely disposed supporting beams attached upon said supporting pylons, reversible drive motor means for said hoist, reduction gear means operably attached to said drive motor to control the speed of said hoist, a pair of grooved cable drums straddle-mounted between supporting brackets suspended from said transverse supporting beams, pulley means mounted approximately at mid-span of said supporting beams, cable means attached to said cable drums extending through said pulley means, guide roller means cooperable with said cable drums for guiding said cable means into the grooves of said cable drums, and telescoping shaft means connecting said drive motor means and said pair of cable drums, said motor means and said gear means being housed in said cabinet.

3. A hoist for power boats comprising quadruple supporting pylons rectangularly spaced, base members for said supporting pylons, said base members having fender mounting flanges formed thereon, an equipment cabinet forming one of said pylons having at least one access door swingably attached thereto, transverse supporting beam members removably attached to the top surfaces of said supporting pylons, motor means for driving said hoist, gear reducer means for obtaining the desired speed of hoist movement, said gear reducer means also preventing accidental free movement of said hoist, drive shaft means connecting said motor and said gear reducer means, operating switch means normally biased to an inoperative position for activating said motor means, cable means for said hoist, plural drum means having grooves formed therein for coilably receiving said cable, plural roller means frictionally cooperable with said drum means to position said cable within the grooves of said drums, pulley means attached medially the ends of said transverse supporting members for directing the lifting cable, and bearing means for said cable drums and said rollers to facilitate the operation thereof, said motor means and said gear means being housed in said cabinet.

4. A power hoist for boats comprising a plurality of upstanding derrick members having inverted U-shaped base members, reinforcing members positioned medially between the ends of said derrick members, fender supporting flanges formed on said base members, a metallic enclosure cabinet forming one of said derrick members, a door hingeably attached to said enclosure cabinet, transversely disposed weight supporting beams resting upon said derrick members, an electric powered reversible motor, gear reducer means, drive means connecting said motor and said gear reducer, limit switch means operably attached to said gear reducer to limit the travel of said hoist by interrupting the power supply to said motor, control switch means to manually control said hoist, a pair of helically grooved cable drums supported within said derrick members, shaft means connecting said gear reducer and said cable drum, pulley members mounted medially between the ends of said transverse beams, cable means attached to said cable drums and extending through said pulley members, hook means attached to the free ends of said cable means for releasably engaging the lifting rings of a boat, roller members frictionally cooperable with said grooved cable drums and said cable means to align said cable in the grooves of said cable drums and to prevent cable backlash when tension is removed therefrom, anti-friction bearings supporting said cable drums and said roller means, and supporting brackets suspended from said transverse beams and said derricks for supporting said bearings, said motor and said gear means being housed in said cabinet.

5. A hoist mechanism comprising a plurality of movable upstanding derrick members relatively spaced in a rectangular position from each other, an enlarged inverted U-shaped channel base member forming the base of each said derrick member, stabilizing members positioned medially between the top and base of said derrick members, one of said derricks formed as a metallic cabinet, at least one access door hingeably attached to said metallic cabinet, a pair of transversely disposed weight supporting members each connecting two of said derrick members, power lift means disposed within said metallic cabinet, gear reducer means cooperable with said power lift means, travel limit means attached to said gear reducer to determine the maximum travel of said hoist mechanism, control switch means normally biased to an inoperative position within said metallic cabinet to operate said power lift means, a plurality of cable drum means mounted in anti-friction bearings in longitudinal alignment within each pair of derrick members, telescopically engageable shaft means connecting said longitudinally aligned cable drums, pulley members mounted medially between the ends of said weight supporting members, cable means coilably attached to said cable drums and extending through said pulley members, said cable drums having a helically grooved track therein to alignably receive said cable means, hook means attached to the free ends of said cable means for releasably engaging the object to be hoisted, roller members frictionally cooperable with said cable means to align said cable means in the grooves of said cable drum, and handle means engageable with the driven shaft of said gear reducer for operating said mechanism manually.

6. A boat hoist comprising a plurality of multiple member pylons having enlarged base portions attachable to a dock surface, bumper plank flanges extending inwardly from the base portions of said pylons, control cabinet means having an access opening therein, transverse supporting members removably attached to said pylons, reversible motor means to drive said hoist disposed within said control cabinet, gear reducer means mechanically connected with said motor means, a pair of cable drums operatively connected to said gear reducer means rotatably supported within each pair of said pylons in longitudinal alignment, cable means attached to said cable drums, pulley means attached to said transverse supporting members adapted to guide and support said cable means thereon, idler roller means cooperable with said cables and with said cable drums to prevent the fouling of said cable means, hook means attached to the free end of said cables, support brackets for retaining said cable drums, bearing means mounted in said supporting brackets to minimize rotational friction of said cable drums, telescopically adjustable drive shaft means connecting the pair of cable drums to drive the same in unison and switch means to actuate said motor means.

7. In a device of the type described, two pairs of pylons longitudinally aligned, enlarged weight distributing base members for said pylons, one of said pylons comprising an enclosure cabinet adapted to house hoist mechanism, access door means formed in said enclosure cabinet, supporting members removably attached to and extending transversely between the pylons or each pair of pylons, motor means for operating said device, cable drum means suspended from said supporting members in longitudinal alignment with corresponding pylons of the two pairs of pylons, pulley means suspended one from each of said supporting members approximately mid-way between the pylons of each pair of pylons, two cable means attached each at one end to one of said cable drum means, and each having its opposite free end extending through one of said pulley means, shaft gearing means connecting said power means to one of said cable drums, telescopic drive shaft means operationally connecting said cable drums together, and switch means to activate said motor means thereby to effect the operation of said device, said motor means and said shaft and gearing means being housed in said cabinet.

8. In a power hoist for boats, a plurality of spaced apart supporting derricks having enlarged base members disposed in a rectangular position upon a dock to define an open boat slip therebetween, one of said derricks forming a control cabinet having an access door therein adapted to enclose a motorized drive means, a transverse supporting beam extending across the slip between the derricks of each pair of said derricks, grooved cable drum means positioned within two longitudinally aligned derricks, pulley means attached to said transverse beams at the mid-points thereof, cable means led through said pulley means and attached at one end to said cable drum means, idler roller means cooperable with said cable drum means to guidably receive said cable means in coiled relationship upon said cable drum means, bearing means for said cable drum means to minimize rotational friction thereof, motorized drive means contained within said control cabinet, shaft and gearing means connecting said drive means with said cable drum means, and switch means to connect said drive means to an electric source for actuation.

References Cited in the file of this patent

UNITED STATES PATENTS

| | | |
|---|---|---|
| 2,262,937 | Holmes | Nov. 18, 1941 |
| 2,276,127 | Wahl | Mar. 10, 1942 |
| 2,352,457 | Thompson | June 27, 1944 |
| 2,391,172 | Leland | Dec. 18, 1945 |
| 2,529,948 | Jones | Nov. 14, 1950 |
| 2,619,321 | Haase | Nov. 25, 1952 |
| 2,646,965 | Addicks | July 28, 1953 |
| 2,889,062 | Stearn | June 2, 1959 |
| 2,918,718 | Oberwegner | Dec. 29, 1959 |

FOREIGN PATENTS

| | | |
|---|---|---|
| 57,068 | Switzerland | Sept. 29, 1911 |
| 524,192 | Italy | Apr. 20, 1955 |